United States Patent
Heo et al.

(10) Patent No.: US 9,118,056 B2
(45) Date of Patent: Aug. 25, 2015

(54) ELECTROLYTE MEMBRANE FOR FUEL CELL, METHOD OF MANUFACTURING THE ELECTROLYTE MEMBRANE, MEMBRANE-ELECTRODE ASSEMBLY FOR FUEL CELL INCLUDING THE ELECTROLYTE MEMBRANE, AND FUEL CELL INCLUDING THE MEMBRANE-ELECTRODE ASSEMBLY

(71) Applicant: SAMSUNG ELECTRONICS CO., LTD., Suwon-si, Gyeonggi-do (KR)

(72) Inventors: Pil-won Heo, Yongin-si (KR); Yanase Satoshi, Yokohama (KR); Takezawa Manabu, Yokohama (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 207 days.

(21) Appl. No.: 13/662,667

(22) Filed: Oct. 29, 2012

(65) Prior Publication Data

US 2013/0130150 A1    May 23, 2013

(30) Foreign Application Priority Data

Oct. 27, 2011   (JP) ................................. 2011-235703
Oct. 24, 2012   (KR) ........................ 10-2012-0104210

(51) Int. Cl.
*H01M 8/10*    (2006.01)
*C08J 5/22*    (2006.01)

(52) U.S. Cl.
CPC .............. *H01M 8/102* (2013.01); *C08J 5/2206* (2013.01); *H01M 8/103* (2013.01); *H01M 8/1048* (2013.01); *H01M 8/1051* (2013.01); *C08J 2379/06* (2013.01); *H01M 8/1072* (2013.01); *Y02E 60/521* (2013.01)

(58) Field of Classification Search
CPC ..................................................... H01M 8/102
See application file for complete search history.

(56) References Cited

U.S. PATENT DOCUMENTS

| 7,935,735 | B2 | 5/2011 | Li et al. | |
|---|---|---|---|---|
| 2003/0118887 | A1* | 6/2003 | Serpico et al. | ................... 429/33 |
| 2007/0100078 | A1 | 5/2007 | Li et al. | |
| 2007/0207359 | A1 | 9/2007 | Chen et al. | |
| 2009/0297909 | A1 | 12/2009 | Yamamoto et al. | |
| 2010/0040927 | A1 | 2/2010 | Yoshida et al. | |

FOREIGN PATENT DOCUMENTS

| JP | 2005525682 A | 8/2005 |
|---|---|---|
| JP | 2005525683 A | 8/2005 |
| JP | 2005526875 A | 9/2005 |
| JP | 2005527073 A | 9/2005 |
| JP | 2005527075 A | 9/2005 |
| JP | 2006059698 A | 3/2006 |
| JP | 2006147278 A | 6/2006 |
| JP | 2007141601 A | 6/2007 |
| JP | 2007149642 A | 6/2007 |
| JP | 2008127534 A | 6/2008 |
| JP | 2009026536 A | 2/2009 |
| JP | 2009144067 A | 7/2009 |
| JP | 2010027519 A | 2/2010 |
| JP | 2010520593 A | 6/2010 |
| JP | 2010530915 A | 9/2010 |
| JP | 2011029020 A | 2/2011 |
| JP | 2011044250 A | 3/2011 |
| JP | 2011508369 A | 3/2011 |

OTHER PUBLICATIONS

M. Grujicic, K.M. Chittajallu, Design and optimization of polymer electrolyte membrane (PEM) fuel cells, Oct. 30, 2003, p. 57.*

* cited by examiner

*Primary Examiner* — Milton I Cano
*Assistant Examiner* — Seenam Agbetiafan
(74) *Attorney, Agent, or Firm* — Cantor Colburn LLP

(57) ABSTRACT

An electrolyte membrane for fuel cells, the electrolyte membrane including a polymer film and a polymerization product of a composition comprising i) a plurality of inorganic particles surface-treated with a surface treatment agent including the polymerizable double bonds and ii) a polymerizable acid monomer, wherein the inorganic particles and the polymerizable acid monomer are impregnated within the polymer film.

14 Claims, 1 Drawing Sheet

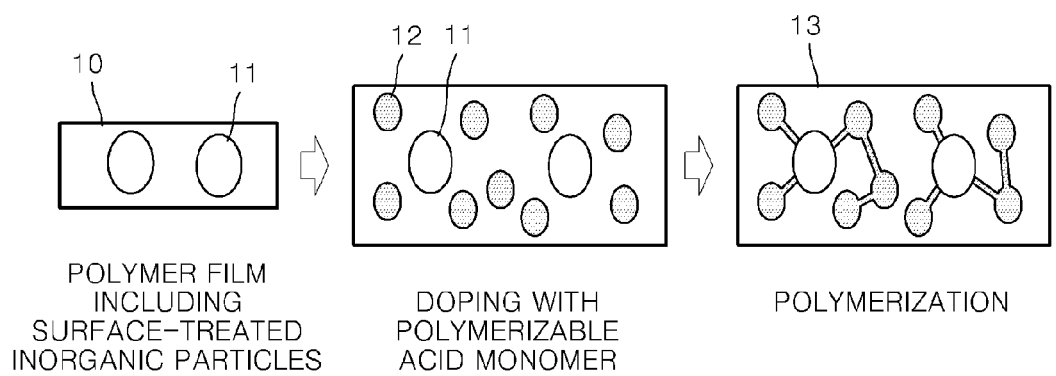

ELECTROLYTE MEMBRANE FOR FUEL CELL, METHOD OF MANUFACTURING THE ELECTROLYTE MEMBRANE, MEMBRANE-ELECTRODE ASSEMBLY FOR FUEL CELL INCLUDING THE ELECTROLYTE MEMBRANE, AND FUEL CELL INCLUDING THE MEMBRANE-ELECTRODE ASSEMBLY

CROSS-REFERENCE TO RELATED APPLICATIONS

This application claims the benefit of Korean Patent Application No. 10-2012-0104210, filed on Sep. 19, 2012, and Japanese Patent Application No. 10-2011-235703, filed on Oct. 27, 2011, and all the benefits accruing therefrom under 35 U.S.C. §119, the contents of which in their entirety are incorporated herein by reference.

BACKGROUND

1. Field

The present disclosure relates to an electrolyte membrane for fuel cells that are operable in high-temperature, non-humidified conditions, a method of manufacturing the electrolyte membrane, a membrane-electrode assembly for fuel cells that includes the electrolyte membrane, and a fuel cell including the membrane electrode assembly.

2. Description of the Related Art

An electrolyte membrane including a polymer film and phosphoric acid is known to be available as an electrolyte membrane for a fuel cell operable at a high temperature of about 150° C. or higher in a non-humidified condition.

As a liquid acid, phosphoric acid likely flows out of the electrolyte membrane during operation, and thus lowers performance of the fuel cell and corrodes other peripheral parts over time. To address these drawbacks, a method of impregnating a polymer film with monomers, instead of phosphoric acid, and polymerizing the monomers is suggested to suppress elution of the phosphoric acid from the polymer electrolyte membrane.

However, an electrolyte membrane impregnated with a monomer has insufficient strength, and is apt to be thin when compressed at high temperatures.

These drawbacks may degrade performance of the fuel cell during operation.

To address these drawbacks, the polymer film may be enhanced by, for example, adding a fiber or inorganic particles when manufacturing the polymer film.

However, electrolyte membranes manufactured using these methods do not have sufficient film strength, and thus there is still a demand for an improved electrolyte membrane.

SUMMARY

Provided is a polymer film for fuel cells that includes a polymer film impregnated with a polymerizable acid monomer, a method of manufacturing the same, a membrane-electrode assembly for fuel cells that includes the electrolyte membrane, and a fuel cell including the membrane-electrode assembly.

Additional aspects will be set forth in part in the description which follows and, in part, will be apparent from the description.

According to an aspect, there is provided an electrolyte membrane for fuel cells, the electrolyte membrane including: a polymer film and a polymerization product of a composition including i) a plurality of inorganic particles surface-treated with a surface treatment agent including the polymerizable double bond and ii) a polymerizable acid monomer, wherein the inorganic particles and the polymerizable acid monomer are impregnated within the polymer film.

An amount of the inorganic particles in the electrolyte membrane may be from about 1 to 50 wt % of the polymer film, or the inorganic particles may be from about 1 part by weight to about 50 parts by weight, based on 100 parts by weight of the polymer film.

The polymer film may include at least one polymer selected from polybenzimidazoles, polypyridines, polypyrimidines, polyimidazoles, polybenzothiazoles, polybenzoxazoles, polyoxadiazoles, polyquinolines, polyquinoxalines, polythiadiazoles, polytetrazapyrenes, polyoxazoles, polythiazoles, polyvinylpyridines, and polyvinylimidazoles.

The polymerizable acid monomer may be at least one selected from acrylic acid, methacrylic acid, ethacrylic acid, α-chloroacrylic acid, α-cyanoacrylic acid, β-methacrylic acid (crotonic acid), α-phenylacrylic acid, β-acryloxypropionic acid, sorbic acid, α-chlorosorbic acid, 2'-methylisocrotonic acid, cinnamic acid, p-chloro-cinnamic acid, β-stearyl acid, itaconic acid, citraconic acid, mesaconic acid, glutaconic acid, aconitic acid, maleic acid, fumaric acid, allylsulfonic acid, 4-vinylbenzylsulfonic acid, vinyl-toluenesulfonic acid, styrenesulfonic acid, sulfoethylmethacrylate, sulfoethylacrylate, sulfopropylmethacrylate, sulfopropylacrylate, 2-hydroxy-3-methacryloxypropylsulfonic acid, allylphosphonic acid, vinylbenzylphosphonic acid, methacrylamido(C1-C8)alkyl phosphonic acids, acrylamido(C1-C8)alkyl phosphonic acids, acrylamido(C1-C8)alkyldiphosphonic acids, phosphonomethylated vinylamines, (meth)acrylphosphonic acid, vinylphosphonic acid, vinylsulfonic acid, and 2-acrylamide-2-methylpropanesulfonic acid.

An amount of the polymerizable acid monomer may be from about 50 parts to about 500 parts by weight, based on 100 parts by weight of the polymer in the polymer film.

The surface treatment agent may include a double bond polymerized with the polymerizable acid monomer, and may be at least one selected from methacrylsilane, vinylsilane, and acrylsilane.

The electrolyte membrane may further include a crosslinking agent in the composition that is impregnated along with the polymerizable acid monomer.

In another aspect, the electrolyte membrane includes a polymer film; a polymer film; and a polymerization product of a composition comprising i) the plurality of inorganic particles surface-treated with the surface treatment agent including the polymerizable double bond, ii) the polymerizable acid monomer, and (iii) the crosslinking agent.

a polymerization product of a composition comprising i) the plurality of inorganic particles surface-treated with the surface treatment agent including the polymerizable double bond, ii) the polymerizable acid monomer, and (iii) the crosslinking agent.

According to another aspect, a method of manufacturing an electrolyte membrane for fuel cells includes: combining inorganic particles surface-treated with a surface-treatment agent having a polymerizable double bond and a polymer-containing solution to prepare a coating solution; applying the coating solution to a substrate to form a polymer film including the inorganic particles; contacting the polymer film with a polymerizable acid monomer to impregnate the polymer film with the polymerizable acid monomer; and polymerizing the polymerizable acid monomer and the inorganic particles.

The inorganic particles may be added in an amount of about 1 part to about 50 parts by weight, based on 100 parts by weight of a total amount of the polymer film and the inorganic particles.

The polymer film may include at least one polymer selected from polybenzimidazoles, polypyridines, polypyrimidines, polyimidazoles, polybenzothiazoles, polybenzoxazoles, polyoxadiazoles, polyquinolines, polyquinoxalines, polythiadiazoles, polytetrazapyrenes, polyoxazoles, polythiazoles, polyvinylpyridines, and polyvinylimidazoles The solution containing the polymerizable acid monomer may further include a cross-linking agent.

An amount of the cross-linking agent may be from about 0.1 wt % to about 50 wt %, based on 100 parts by weight of the polymerizable acid monomer.

According to another aspect, a membrane-electrode assembly for a fuel cell includes: a fuel electrode; an oxygen electrode; and the above-described electrolyte membrane disposed between the oxygen electrode and the fuel electrode.

According to another aspect, a fuel cell includes the membrane-electrode assembly.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, an embodiment of an electrolyte membrane for fuel cells, a method of manufacturing the fuel cell, a membrane-electrode assembly (MEA) including the electrolyte membrane, and a fuel cell including the MEA will be described in detail. The electrolyte membrane may be manufactured by impregnating a polymer film including inorganic particles surface-treated with a surface treatment agent having a polymerizable double bond, with a polymerizable acid monomer, and polymerizing the polymerizable acid monomer, so that transport of an acid component out of the electrolyte membrane may be substantially or effectively prevented, and the electrolyte membrane may have an improved strength.

The electrolyte membrane includes a polymer film; and a polymerization product of a composition including i) a plurality of inorganic particles surface-treated with a surface treatment agent and ii) a polymerizable acid monomer, the inorganic particles surface-treated with a surface treatment agent including the polymerizable double bond and the polymerizable acid monomer are impregnated within the polymer film. In a specific embodiment, the surface-treatment agent for the inorganic particles includes a functional group polymerizable with the polymerizable acid monomer, for example a polymerizable double bond, such that the electrolyte membrane further includes the polymerization product of the polymerizable acid monomer and the polymerizable functional group of the surface-treatment agent.

The inorganic particles may be added in an amount of about 1 part to about 50 parts by weight, specifically about 2 part to about 40 parts by weight, more specifically about 4 part to about 30 parts by weight, based on 100 parts by weight of a total amount of the polymer film and the inorganic particles.

1. Structure of a Fuel Cell

First, a structure of a fuel cell according to an embodiment will be described in further detail.

The fuel cell may have a structure with a membrane-electrode assembly (MEA) supported by a separator, and may be operable at a high temperature of about 150° C. in non-humidified conditions. In an embodiment, the MEA may comprise a fuel electrode, an oxygen electrode, and an electrolyte membrane disposed between the fuel electrode and the oxygen electrode.

Hereinafter, each of the components of the MEA will be described in greater detail.

1.1. Fuel Electrode

A fuel electrode, which serves as an anode of a fuel cell, comprises a catalyst layer including an electrode catalyst, and a gas diffusion layer. In particular, hydrogen gas is externally supplied to the fuel electrode via the gas diffusion layer so that an electrode reaction represented in Reaction Scheme 1 below takes place in the fuel electrode.

In general, a platinum catalyst or a platinum-ruthenium catalyst is used as the electrode catalyst in the fuel electrode, supported on a carbonaceous support such as carbon black.

Reaction Scheme 1

Protons generated from the electrode reaction migrate through the electrolyte membrane to the oxygen electrode, while electrons reach the oxygen electrode through an external circuit. Electric current is generated from the electrons and may be used as an external power source.

1.2. Oxygen Electrode

An oxygen electrode (also referred to as an "air electrode"), which serves as a cathode of a fuel cell, comprises a catalyst layer including an electrode catalyst and a gas diffusion layer. For example, an electrode reaction represented in Reaction Scheme 2 below takes place in the oxygen electrode.

Reaction Scheme 2

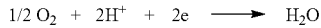

In general, a platinum catalyst is used as the electrode catalyst in the oxygen electrode, supported on a carbonaceous support such as carbon black.

Electrons are supplied via the external circuit, the protons generated in the fuel electrode transport through the electrolyte membrane, and oxygen molecules are externally supplied via the gas diffusion layer of the oxygen electrode react together on the electrode catalyst, so that water is generated.

1.3. Electrolyte Membrane

The electrolyte membrane serves as a separator to prevent the fuel (e.g., hydrogen gas) and an oxidizing agent (e.g., oxygen gas in the air) from mixing. The electrolyte membrane also allows the protons generated in the fuel electrode to transport to the oxygen electrode. In an embodiment, in order to prevent transport of an acid component out of the electrolyte membrane, an electrolyte membrane impregnated with a polymerizable acid monomer, instead of a liquid acid such as phosphoric acid, may be used.

To improve the strength of the electrolyte membrane, inorganic particles surface-treated with a surface treatment agent having a polymerizable double bond may be introduced into the polymer film of the electrolyte membrane.

Hereinafter, a structure of an embodiment of an electrolyte membrane will be described in further detail.

1.3.1. Polymer Film

A polymer film that forms a matrix of the electrolyte membrane means a membrane or film of a polymer. The polymer film may have a uniform properties and a porous structure. A polymer for the polymer film is not particularly limited, and may be any polymer suitable for forming a polymer film that can be used in high-temperature, non-humidified conditions.

The polymer film may include, for example, at least one polymer selected from polybenzimidazoles, polypyridines, polypyrimidines, polyimidazoles, polybenzothiazoles, polybenzoxazoles, polyoxadiazoles, polyquinolines, polyquinoxalines, polythiadiazoles, polytetrazapyrenes, polyoxazoles, polythiazoles, polyvinylpyridines, and polyvinylimidazoles.

These polymers may be used alone, or in a combination of multiple species selected therefrom. In some embodiments, the polymer may be polybenzimidazole (hereinafter, "PBI"), polyimidazole, polybenzthiazole, polybenzoxazoles, polytriazole, polyoxadiazole, polythiadiaozle, polypyrazole, polyquinoxaline, polypyridine, polypyrimidine, polytetrazapyrenes, or a combination thereof.

The polymer may include a repeating unit represented by Formula 1 below. When including the repeating unit, the electrolyte membrane may have improved thermal resistance and may be impregnated with a sufficient amount of polymerizable acid monomer. Accordingly, in some embodiments, a fuel cell including the electrolyte membrane may be operable at high temperatures, and may have a higher proton conductivity due to the sufficient amount of polymerizable acid monomer in the electrolyte membrane.

Formula 1

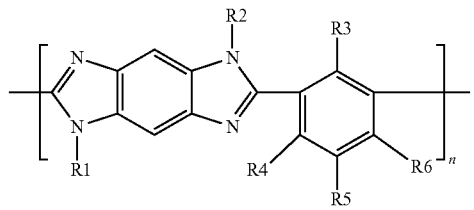

In Formula 1, $R_1$ to $R_6$ are each independently a substituent selected from a hydrogen atom, a C1-C20 alkyl group, an allyl group, a C6-C20 aryl group, a sulfonic acid group, a hydroxy group, a nitro group, and an amino group, and n is a degree of polymerization, for example n is from about 10 to about 10000, about 10 to about 1000, or about 10 to about 100.

In the polymer of Formula 1, for example, each of $R_1$ to $R_6$ may be hydrogen.

1.3.2. Surface-Treated Inorganic Particles

The electrolyte membrane includes inorganic particles surface-treated with a surface treatment agent, the surface treatment agent having a functional group co-polymerizable with the polymerizable acid monomer, for example a polymerizable double bond in the polymer film. Surface-treating the inorganic particles may provide improved dispersibility in a coating solution (e.g., a solution of a polymer for forming the polymer film dissolved in a solvent, which is also referred to as a "casting solution") for forming the polymer film, as compared to when non-surface treated inorganic particles are used, thereby facilitating formation of a uniform polymer film. In addition, while being polymerized, the functional group such as the double bond of the polymerizable acid monomer impregnated into the polymer film may also react with the polymerizable functional group, for example a double bond on the surfaces of the inorganic particles, so that the strength of the polymer film may be improved.

Inorganic Particles

In some embodiments, the inorganic particles in the polymer film may be not particularly limited, and may be any material able to bond with the surface treatment agent when treated with the surface treatment agent. Non-limiting examples of the inorganic particles include silica particles, alumina particles, titanium oxide particles, metal-element particles, and metal-alloy particles. The metal and/or the metal alloy may be a metal of Groups 3 to 14 of the Periodic Table of the Elements, specifically a metal of Groups 4 to 13. In an embodiment, in consideration of stability after treatment with the surface treatment agent, the inorganic particles may be silica particles.

Surface Treatment Agent

The "surface treatment agent having a polymerizable double bond" is a surface treatment agent having a double bond that is able to react with a polymerizable group such as a double bond of the polymerizable acid monomer. The surface treatment agent may be, for example, a silane having a double bond and at least one hydrolyzable silicon group reactive with the inorganic particles, for example at least one selected from methacrylsilane, vinylsilane, and acrylsilane. Specific examples of the foregoing silanes include vinyl trimethoxysilane, vinyl trichlorosilane, vinyl triethoxysilane, vinyl triacetoxysilane, vinyl-tris(β-methoxyethoxy)silane, γ-methacryloxypropyl trimethoxysilane, γ-methacryloxypropyl triethoxysilane γ-acryloxypropyl trimethoxysilane, γ-acryloxypropyl triethoxysilane, and the like. Using the surface-treatment agent, a chemical bond may be formed between the polymerizable acid monomer, which will be further described below, and the inorganic particles, via the surface treatment agent, so that the strength of the polymer film may be improved, and the polymerizable acid monomer may be substantially or effectively prevented from transporting out of the polymer film.

Amount of Surface-Treated Inorganic Particles

An amount of the inorganic particles treated with the surface treatment agent may be from about 1 wt % to about 50 wt %, specifically about 2 wt % to about 40 wt %, more specifically about 4 wt % to about 30 wt %, based on a total weight of the polymer film (before being impregnated with the polymerizable acid monomer). In an embodiment, the amount of the inorganic particles treated with the surface treatment agent is from about 10 wt % to about 30 wt %, based on a total weight of the polymer film.

When the amount of the surface-treated inorganic particles is within this range, the electrolyte membrane may have improved strength as described above, without a reduction in proton conductivity.

1.3.3. Polymerizable Acid Monomer

In some embodiments, the "polymerizable acid monomer" refers to a monomer having a functional group that can form a bond between atoms via an addition polymerization reaction or condensation reaction, and a functional group that can dissociate hydrogen atoms into protons. For example, the functional group that can form a bond between atoms via an addition polymerization reaction or condensation reaction includes at least one selected from a carbon-carbon double bond, a carbon-carbon triple bond, a nitrogen-carbon double bond, an epoxy ring, a hydroxyl group, a carboxyl group, an amino group, and an aldehyde group. For example, the functional group that can dissociate hydrogen atoms into protons includes at least one selected from a phosphonic acid group, a sulfonic acid group, a phosphoric acid group, a phosphinic acid group, a carboxyl group, and a hydroxyl group.

In an embodiment the polymerizable acid monomer is a compound having a carbon-carbon double bond and a carboxylic, phosphonic acid, or sulfonic acid group. Non-limiting examples of the polymerizable acid monomer are vinylphosphonic acid, vinylsulfonic acid, and 2-acrylamide-2-methylpropanesulfonic acid, which may be used alone or in a combination thereof. Other examples of the polymerizable acid monomer are acrylic acid, methacrylic acid, ethacrylic acid, α-chloroacrylic acid, α-cyanoacrylic acid, β-methacrylic acid (crotonic acid), α-phenylacrylic acid, β-acryloxypropionic acid, sorbic acid, α-chlorosorbic acid, 2'-methylisocrotonic acid, cinnamic acid, p-chloro-cinnamic acid, β-stearyl acid, itaconic acid, citraconic acid, mesaconic acid, glutaconic acid, aconitic acid, maleic acid, fumaric acid, allylsulfonic acid, 4-vinylbenzylsulfonic acid, vinyl-toluenesulfonic acid, styrenesulfonic acid, sulfoethylmethacrylate, sulfoethylacrylate, sulfopropylmethacrylate, sulfopropylacrylate, 2-hydroxy-3-methacryloxypropylsulfonic acid, allylphosphonic acid, vinylbenzylphosphonic acid, methacrylamido(C1-C8)alkyl phosphonic acids, acrylamido(C1-C8)alkyl phosphonic acids, acrylamido(C1-C8)alkyldiphosphonic acids, phosphonomethylated vinylamines, and (meth) acrylphosphonic acid. For example, the polymerizable acid monomer may be vinylphosphonic acid. Vinylphosphonic acid has high thermal resistance, and has a high degree of polymerization of the vinyl group, so that it is easy to control performance of the electrolyte membrane with vinylphosphonic acid.

An amount of the polymerizable acid monomer may be from about 50 to about 500 parts by weight, specifically about 60 to about 450 parts by weight, more specifically about 70 to about 400 parts by weight, based on 100 parts by weight of the polymer of the polymer film.

1.3.4. Cross-Linking Agent

In some embodiments, a cross-linking agent may be impregnated into the polymer film including the surface-treated inorganic particles before, during, or after the polymerizable acid monomer being impregnated thereinto to form the electrolyte membrane via polymerization of the polymerizable acid monomer, so that the electrolyte membrane may have a cross-linked structure.

The electrolyte membrane having the cross-linked structure may have improved thermal resistance. In this regard, "having the cross-linked structure" means that a polymer structure obtained from polymerization of the polymerizable acid monomer includes a cross-linked structure originating from the use of the cross-linking agent.

That is, when the electrolyte membrane includes "the cross-linked structure," the double bond of the polymerizable acid monomer and double bonds of the cross-linking agent may be polymerized together; the double bond of the surface treatment agent and double bonds of the cross-linking agent may be polymerized together; or a combination thereof. In this regard, for example, if the cross-linking agent includes at least two double bonds, and for example, there are two polymer chains resulting from the polymerization of the polymerizable acid monomer, the two polymer chains are cross-linked by the cross-linking agent. The cross-linking agent may be a compound structurally having at least two polymerizable double bonds. Non-limiting examples of the cross-linking agent include polyethyleneglycol dimethacrylate, ethyleneglycol dimethacrylate, N',N-methylene bisacrylamide, ethylene diacrylate, polyethyleneglycol diacrylate, allyl methacrylate, diethyleneglycol dimethacrylate, triethyleneglycol dimethacrylate, tetraethyleneglycol dimethacrylate, 1,3-butanediol dimethacrylate, glycerine dimethacrylate, diurethane dimethacrylate, trimethylpropane trimethacrylate, epoxy acrylates such as Ebecryl, carbinol, butadiene, isoprene, chloroprene, divinylbenzene, bisphenol A dimethacrylate, divinylsulfone, and diethyleneglycol divinylether, which may be used alone or in a combination of multiple species thereof.

1.3.5. Other Components in the Electrolyte Membrane

In some embodiments, the electrolyte membrane may include an additional component, in addition to those described above, to help proton conduction. Non-limiting examples of the additional component include a plasticizer and polyether. For example, the additional component is not particularly limited thereto, and may be any suitable material having proton conductivity. For example, the plasticizer may be dioctyl phthalate. The polyether may be polyethyleneglycol.

1.3.6. Electrolyte Membrane Obtained After Polymerization

In some embodiments, the electrolyte membrane may be a membrane obtained by impregnating a polymer film containing the surface-treated inorganic particles with a polymerizable acid monomer, and polymerizing the polymerizable acid monomer.

In an embodiment, in the electrolyte membrane, a polymer having proton dissociable-acidic group is obtained by a polymerization of polymerizable acid monomer having polymerizable functional group. The polymer having proton dissociable-acidic group is present in the polymer film containing the surface-treated inorganic particles. In some embodiments, the polymer obtained from polymerization of the polymerizable acid monomer is between polymer chains of the polymer in the polymer film. In some other embodiments, when the polymer film is porous, the polymer obtained from the polymerization of the polymerizable acid monomer may be filled in the pores of the porous polymer film. In addition, the polymer obtained from polymerization of the polymerizable acid monomer may include reaction product of co-polymerization with the double bond of the surface treatment groups. The polymer obtained from polymerization of the polymerizable acid monomer may thus be a copolymer containing units from the polymer chains of the polymer in the polymer film, the surface active agent, or both.

The polymer obtained from the polymerization of the polymerizable acid monomer may be, for example, polyvinylphosphonic acid when the polymerizable acid monomer is vinylphosphonic acid, or in other embodiments, may be poly-2-acrylamide-2-methylpropanesulfonic acid when the polymerizable acid monomer is 2-acrylamide-2-methylpropanesulfonic acid. When a mixture of multiple species of monomers is used as the polymerizable acid monomer, a polymer result therefrom may be a copolymerized polymer of the monomers.

Hereinafter, a method of manufacturing an electrolyte membrane, according to an embodiment of the present disclosure, will be described with reference to FIG. 1.

First, a polymer film 10 including inorganic particles 11 surface-treated with a surface treatment agent having a polymerizable double bond is prepared using a polymer and the inorganic particles 11.

The polymer film 10 containing the surface-treated inorganic particles 11 is doped, for example impregnated with a polymerizable acid monomer. Subsequently, as shown, the resulting structure is subjected to polymerization to obtain an electrolyte membrane 13 including a polymerization product of the polymerizable acid monomer 12. As also shown, where the surface treatment agent is a surface treatment agent having a double bond that is able to react with a functional group, such as a double bond of the polymerizable acid monomer, a polymerization product is the polymerization product between the surface-treated inorganic particles 11, and the polymerizable acid monomer 12. Thus, the term "polymerization" as used herein includes both a polymerization of the polymerizable acid monomer and a reaction of the polymerizable double bond of the surface treatment agent of the inorganic particles and a functional group of the polymerizable acid monomer.

Although not illustrated in FIG. 1, a cross-linking agent may be further added, in addition to the polymerizable acid monomer 12. The cross-linking agent may participate in the polymerization of the polymerizable acid monomer 12 and the surface-treated inorganic particles 11 where the surface treatment agent includes a double bond. In this regard, the polymerization between the polymerizable acid monomer and the surface-treated inorganic particles refers to a polymerization between the polymerizable acid monomer and the surface-treatment agent on the surfaces of the inorganic particles. The cross-linking agent may also participate in the polymerization of the polymerizable acid monomer 12 and polymer chains of the polymer in the polymer film (not shown).

In some embodiments, the electrolyte membrane may include a polymer film; and a polymerization product of the polymerizable acid monomer, and the inorganic particles surface-treated with the surface-treatment agent including the polymerizable double bond. In other embodiments the electrolyte membrane may include a polymer film; and a polymerization product of the polymerizable acid monomer with the inorganic particles surface-treated with the surface-treatment agent including the polymerizable double bond; the polymer chains of the polymer in the polymer film; a crosslinking agent; or a combination thereof.

2.0. Method of Manufacturing a Fuel Cell

A structure of the fuel cell according to an embodiment is as described above. Hereinafter, a method of manufacturing the fuel cell having the above-described structure, according to an embodiment of the present disclosure will be further described.

Following manufacturing a fuel electrode, an oxygen electrode, and an electrolyte membrane, an MEA may be manufactured from the fuel electrode, the oxygen electrode, and the electrode membrane. Then, the fuel cell may be manufactured using the MEA. Hereinafter, each operation of the method will be described in sequence.

2.1. Manufacture of Electrodes

A fuel electrode (anode) and an oxygen electrode (cathode) are electrode layers that contact gas supplied during operation of the fuel cell. The manufacture of the fuel electrode and the oxygen electrode may be determined by one of skill in the art without undue experimentation.

2.2. Manufacture of Electrolyte Membrane

In an embodiment, the electrolyte membrane may be manufactured via coating solution preparation, film formation, acid impregnation, and polymerization operations.

2.2.1. Preparation of Coating Solution

In the preparation of the coating solution, inorganic particles surface-treated with a surface treatment agent having a polymerizable double bond may be added into a polymer-containing solution to prepare a coating solution (cast solution).

Surface Treatment of Inorganic Particles

First, surfaces of the above-described inorganic particles, for example, silica particles, may be treated by silane coupling using a silane coupling agent, for example, methacrylsilane, vinylsilane, or acrylsilane, to obtain the inorganic particles having a polymerizable double bond on the surfaces. For example, a method of treating surfaces of inorganic particles may include contacting, e.g., mixing, the inorganic particles with a solution containing a surface-treatment agent, separating the inorganic particles from the solution, and drying the inorganic particles. The surface-treated inorganic particles may be suitable commercially purchasable inorganic particles.

Preparation of a Casting Solution

Subsequently, a polymer, for example, FBI, for forming the polymer film described above may be dissolved in a solvent to prepare a solution of the polymer, followed by adding the surface-treated inorganic particles prepared as described above to the solution. The resulting solution may then be stirred with an agitator to obtain a homogeneous solution, which is used as a casting solution (cast solution) for forming the polymer film. Whether the casting solution is sufficiently homogeneous or not may be determined by observing its appearance. When the casting solution appears nearly transparent, the cast solution may be determined to be sufficiently homogeneous.

Non-limiting examples of the solvent used in the casting solution are organic solvents, including formamide, N-methylformamide, N,N-dimethylformamide, N-methylacetamide, N,N-dimethylacetamide, N-methylpropioamide, 2-pyrrolidinone, and N-methylpyrrolidone, which may be appropriately selected in consideration of solubility with respect to the polymer, such as FBI.

In some embodiments, the casting solution for use in manufacturing the electrolyte membrane may further include an additive if necessary. An example of the additive may be water or a solvent added to select a viscosity of the casting solution.

2.2.2. Film Formation

The film formation operation may include coating the casting solution prepared above on a substrate, for example, a glass substrate, to form a polymer film including the surface-treated inorganic particles. In particular, after being applied onto the substrate, the casting solution may be disposed, e.g., coated, on the substrate using a suitable method, for example, by spreading the casting solution using an applicator with an adjustable gap, e.g., a doctor blade or a comma coater, to provide an appropriate thickness, and evaporating the solvent form the casting solution to dry the casting solution, thereby forming the polymer film.

The drying may be performed at a temperature of from about 40° C. to about 100° C., specifically about 45° C. to about 90° C., more specifically about 50° C. to about 80° C., by a suitable method, for example, using a heater, e.g., an infrared or convection dryer.

2.2.3. Acid Impregnation Operation

The acid impregnation operation may include contacting, e.g., dipping, the polymer film formed in the film formation operation in a solution containing the polymerizable acid monomer to impregnate the polymer film with the polymerizable acid monomer.

Contacting the polymer film in the solution containing the polymerizable acid monomer is an exemplary method of impregnating the polymer film with the polymerizable acid monomer, but is not limited thereto.

To complete the acid impregnation operation within a suitably short time, while heating the solution containing the polymerizable acid monomer at a temperature from about 40° C. to about 90° C., the polymer film may be contacted with the solution containing the polymerizable acid monomer to be impregnated with the polymerizable acid monomer.

In some embodiments, a cross-linking agent may be further added to the solution containing the polymerizable acid monomer if desired. The thermal resistance of the electrolyte membrane may be improved by addition of the cross-linking agent. Detailed examples of the cross-linking agent are as described above.

In consideration of thermal resistance improvement of the electrolyte membrane, an amount of the cross-linking agent in the solution containing the polymerizable acid monomer may be from about 0.1 wt % to about 50 wt %, and in some embodiments, from 1 wt % to about 30 wt %, based on 100 weight percent of the polymerizable acid monomer.

2.2.4. Polymerization Operation

The polymerization operation is a process of polymerizing the polymerizable acid monomer impregnated in the polymer film by polymerization of polymerizable substituents in the polymerizable acid monomer. In an embodiment, since the polymer film contains the inorganic particles surface-treated to have a polymerizable double bond thereon, the polymerizable substituent in the polymerizable acid monomer impregnated in the polymer film may react with the polymerizable double bond on the surfaces of the inorganic particles, so that the strength of the polymer film may be enhanced. In some embodiments, when the solution containing the polymerizable acid monomer includes a cross-linking agent, the polymerizable substituent in the polymerizable acid monomer impregnated in the polymer film may also react with the cross-linking agent, so that the thermal resistance of the polymer film may be improved.

Non-limiting examples of methods of polymerizing the polymerizable acid monomer are thermal polymerization using a polymerization initiator, ultraviolet (UV) polymerization, plasma polymerization, and polymerization using iono-radiant rays (for example, corpuscular rays, such as α-rays, β-rays, quantums, electrons, or neutrons, or electromagnetic rays, such as γ-rays or X-rays). In thermal polymerization, the polymer film may be impregnated with the polymerizable acid monomer solution containing a polymerization initiator, and then heated, for example, in an oven. In this regard, heating conditions for polymerization, such as heating temperature, ad heating time, or the like may be adjustable in consideration of the characteristics of the electrolyte membrane.

As an example of the polymerization initiator, 2,2'-azobis (2-methylpropionamidine)dipropic acid, or azobisisobutyronitrile (AIBN) may be added to the solution containing the polymerizable acid monomer. In polymerization using UV rays, UV rays may be irradiated onto the polymer film impregnated with the solution containing the polymerizable acid monomer. In polymerization using plasma, plasma may be irradiated onto the polymer film impregnated with the solution containing the polymerizable acid monomer. In polymerization using iono-radiant rays, iono-radiant rays may be irradiated onto the polymer film impregnated with the solution containing the polymerizable acid monomer. In these polymerization methods using UV, plasma, or ionic-radiant rays, irradiation conditions, such as irradiation intensity, irradiation time, or the like may be adjustable in consideration of the characteristics of the electrolyte membrane.

In some embodiments, as a method of polymerizing the polymerizable acid monomer, a polymerization method using iono-radiant rays, for example, using electromagnetic rays, among the above-listed methods, may be used. When polymerization is performed by irradiation of iono-radiant rays (for example, electromagnetic rays), the time it takes to polymerize the polymerizable acid monomer in manufacturing the electrolyte membrane may be markedly reduced as compared with the other polymerization methods. Furthermore, the polymerization using iono-radiant rays does not use a polymerization initiator, so that negative effects from the use of the polymerization initiator, such as delocalized polymerization resulting from non-homogeneous distribution of the polymerization initiator, defoamation, or the presence of the remnant polymerization initiator in a final product, may be prevented.

2.3. Manufacture of MEA

Next, an MEA may be manufactured using the electrodes and the electrolyte membranes manufactured as described above. In a method of manufacturing the MEA, the electrolyte membrane may be supported by the fuel electrode and the oxygen electrode. For example, for a polymer electrolyte membrane fuel cell (PEMFC), the electrodes disposed respectively on opposite sides of the electrolyte membrane manufactured as described above, with catalyst layers and a gas diffusion layer are disposed both sides of the electrolyte membrane, are assembled together to form the MEA. To more tightly bind the electrodes and the electrolyte membrane, the MEA may be pressed by a force in a direction perpendicular to a surface of the electrolyte membrane thereof.

2.4. Manufacture of Fuel Cell

According to an embodiment of the present disclosure, a fuel cell may be manufactured by a known method using the above-described MEA. As described above, separators, for example, metal separators may be disposed respectively on opposite surfaces of the MEA to form a unit cell. A plurality of such unit cells may be arranged to form a fuel cell stack.

EXAMPLES

Hereinafter, one or more embodiments of the present disclosure will be described in detail with reference to the following examples. These examples are not intended to limit the purpose and scope of the one or more embodiments.

Example 1

A 10 wt % polybenzimidazole (hereinafter, "PBI", having Formula 1, where all of $R_1$ to $R_6$ are hydrogen atoms and n may be from about 10 to 10000, for example, 30) solution in N,N-dimethylacetamide (hereinafter, "DMAC") was prepared, and a solution of silica particles (SX008-DFA, available from Admatechs) having an average particle diameter of about 15 nm, surface-treated with methacrylsilane, in DMAC was added to the 10 wt % polybenzimidazole solution so that 10 parts by weight of the silica particles were added based on 100 parts by weight of FBI of the polybenzimidazole solution, followed by stirring the mixture with an agitator for about 30 minutes to prepare a cast solution.

The cast solution was cast (coated) on a glass substrate, and then heated on a 60° C.-heater to evaporate the solvent and obtain a silica particle-containing FBI film having a thickness of about 80 μm.

Next, a doping solution of 100 parts by weight of vinylphosphonic acid ("VPA" available from Tokyo Chemical Industry Co., Ltd. (TCI) in 20 parts by weight of water was prepared for use as a solution for impregnating the silica particle-containing FBI film with the polymerizable acid monomers), and the silica particle-containing FBI film cut to a size of 2×2 cm was immersed in the dope solution at about 80□ for about 3 hours, and then immersed further for 1 hours with an addition of 0.03 parts by weight of a polymerization initiator (Product name "V50", available from Wako Pure Chemical Industries, Ltd.).

Afterward, the FBI film was drawn from the dope solution, followed by removing the remaining dope solution from the FBI film, which was then heated at about 100□ in a vacuum for about 18 hours to polymerize double bonds of chemical species in the FBI membrane, thereby manufacturing an electrolyte membrane.

Example 2

An electrolyte membrane was manufactured in the same manner as in Example 1, except that 30 parts by weight of silica particles were used based on 100 parts by weight of FBI to prepare a cast solution.

Comparative Example 1

An electrolyte membrane was manufactured in the same manner as in Example 1, except that silica particles (Aerosil 300, available from Aerosil of Japan), not surface-treated with methacrylsilane, were added to the cast solution.

Comparative Example 2

An electrolyte membrane was manufactured in the same manner as in Example 1, except that the FBI film was manufactured using a cast solution to which no silica particles were added, and that 3 parts by weight of polyethyleneglycol dimethacrylate (available from Aldrich) with respect to 100 parts by weight of VPA was added as a cross-linking agent to the dope solution.

Comparative Example 3

An electrolyte membrane was manufactured in the same manner as in Comparative Example 2, except that polyethyleneglycol dimethacrylate was not added to the dope solution.

Measurement of Film Strength

Strength of a cast film when separated from the glass substrate, and strength of the cast film during handling were measured. When the film was separated as being cast, without damage, and was not broken even when bent at 90° or greater, the film was determined to have "good" strength.

Measurement of VPA Dope Ratio

A dope ratio of vinyl phosphonic acid (VPA) impregnated into the electrolyte membrane was calculated using Equation 1, wherein A indicates a weight of the silica particle-containing PBI film before the doping, and B indicates a weight of the electrolyte membrane doped with VPA.

$$\text{VPA dope ratio (\%)} = (B-A) \times 100/A \quad \text{Equation 1}$$

Measurement of Proton Conductivity of Electrolyte Membrane

The electrolyte membrane manufactured as described in each of the examples was cut to a size having a diameter of 9 mm, and the electrolyte membrane was inserted into a circular Teflon spacer (having an outer diameter of about 13 mm and an inner diameter of about 9 mm), which was then mount in a cell for measuring conductivity equipped with a Pt electrode. The resulting cell was maintained overnight at about 150□, and proton conductivity of the cell was measured using an alternating current impedance method at about 150□ in non-humidified conditions.

Evaluation of Resistance to Compression of Electrolyte Membrane

A strength on needle test was performed on each of the electrolyte membranes manufactured as described above using a digital material test (INSTRON 55R-5867) to measure resistance to compression of the electrolyte membrane, wherein a leading end of a press was made from a ceramic having a diameter of ϕ1 mm, and the test speed was about 5 mm/min.

As results of the test, a VPA dope ratio, proton conductivity, and resistance to compression of each of the electrolyte membranes are shown in Table 1 below.

TABLE 1

| | Film strength | VPA dope ratio(%) | Proton Conductivity (mS/cm) | Strength on needle test (N/mm) |
|---|---|---|---|---|
| Example 1 | Good | 295 | 7.1 | 6.3 |
| Example 2 | good | 262 | 5.8 | 7.2 |
| Comparative Example 1 | Broken when separated from glass substrate | — | — | — |

TABLE 1-continued

| | Film strength | VPA dope ratio(%) | Proton Conductivity (mS/cm) | Strength on needle test (N/mm) |
|---|---|---|---|---|
| Comparative Example 2 | — | 350 | 4.9 | 4.9 |

Evaluation of Acid Component Transport from the Electrolyte Membrane

Each of the electrolyte membranes was cut by about 2 cm from each edge, disposed between filter papers (Kiriyama filter paper, No 5-C) with a load of about 100 g applied thereto, and then treated at about 150° C. in the air for about 1.5 hour. With the assumption that X is a weight of the electrolyte membrane before the treatment, Y is a weight of the electrolyte membrane after the treatment, D is a VPA dope ratio of the electrolyte membrane, a weight (Z) of acid component in the electrolyte membrane was calculated using Z=X×D/(100+D), and was then used to calculate an acid component transport ratio of the electrolyte membrane using Equation 2.

Acid component transport ratio (%)=(X−Y)×100/Z    Equation 2

The results of the acid component transport test on the electrolyte membranes are shown in Table 2 below.

TABLE 2

| Example | VPA dope ratio (%) | Acid component transport ratio (%) |
|---|---|---|
| Example 2 | 262 | 12 |
| Comparative Example 3 | 351 | 31 |

Referring to Table 1 above, the PBI film of Example 1 including the silica particles surface-treated with methacrylsilane is found to be strong enough as compared with the PBI film of Comparative Example 1 including silica particles not surface treated with methacrylsilane. The PBI film of Comparative Example 1 was broken when separated from the glass plate (substrate) after casted thereon. The electrolyte membranes of Examples 1 and 2 to which the silica particles surface-treated with methacrylsilane were added are found to have greater proton conductivities even with lower VPA dope ratios, and have greater strengths on needle test, as compared with the electrolyte membrane of Comparative Example 1 to which no silica particles was added.

Referring to Table 2 above, the electrolyte membrane of Example 2 to which the silica particles surface-treated with methacrylsilane is found to have a smaller transport ratio of the active component as compared with the electrolyte membrane of Comparative Example 3 to which no silica particle was added. This difference between Example 2 and Comparative Example 3 is attributed to the reaction of the silica particles surface-treated with the surface-treatment agent methacrylsilane having a polymerizable double bond, with the polymerizable acid monomer VPA, which forms bonds in the electrolyte membrane, and thus suppresses transport of the acid component out of the electrolyte membrane.

As described above, according to the one or more of the above embodiments of the present disclosure, a polymer film for fuel cells prepared by being impregnated with a polymerizable acid monomer, a method of manufacturing the same, a membrane-electrode assembly for fuel cells that includes the electrolyte membrane, and a fuel cell including the membrane-electrode assembly are provided. The electrolyte membrane is prepared by impregnating a polymer film including inorganic particles surface-treated with a surface treatment agent having a polymerizable double bond, with a polymerizable acid monomer, and polymerizing the resulting structure, so that transport of the acid component out of the electrolyte membrane may be prevented, and the electrolyte membrane may have an improved strength.

It should be understood that the exemplary embodiments described therein should be considered in a descriptive sense only and not for purposes of limitation. Descriptions of features or aspects within each embodiment shall be considered as available for other similar features, advantages, or aspects in other embodiments.

What is claimed is:

1. An electrolyte membrane for fuel cells, the electrolyte membrane comprising:
   a polymer film and
   a polymerization product of a composition comprising
   i) a plurality of inorganic particles surface-treated with a surface treatment agent including a polymerizable double bond and
   ii) a polymerizable acid monomer,
   wherein the inorganic particles and the polymerizable acid monomer are impregnated within the polymer film.

2. The electrolyte membrane of claim 1, wherein an amount of the inorganic particles is from about 1 part by weight to about 50 parts by weight, based on 100 parts by weight of the polymer film.

3. The electrolyte membrane of claim 1, wherein the polymer film comprises at least one polymer selected from polybenzimidazoles, polypyridines, polypyrimidines, polyimidazoles, polybenzothiazoles, polybenzoxazoles, polyoxadiazoles, polyquinolines, polyquinoxalines, polythiadiazoles, polytetrazapyrenes, polyoxazoles, polythiazoles, polyvinylpyridines, and polyvinylimidazoles.

4. The electrolyte membrane of claim 1, wherein the polymer film comprises a polymer represented by Formula 1 below:

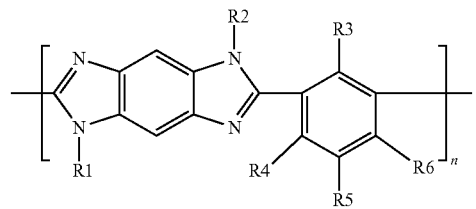

Formula 1 wherein, in Formula 1, $R_1$ to $R_6$ are each independently a substituent selected from a hydrogen atom, a C1-C20 alkyl group, an allyl group, a C6-C20 aryl group, a sulfonic acid group, a hydroxy group, a nitro group, and an amino group, and n is from about 10 to about 10000.

5. The electrolyte membrane of claim 4, wherein, in Formula 1, $R_1$ to $R_6$ is each a hydrogen atom.

6. The electrolyte membrane of claim 1, wherein the polymerizable acid monomer is at least one selected from acrylic acid, methacrylic acid, ethacrylic acid, α-chloroacrylic acid, α-cyanoacrylic acid, β-methacrylic acid (crotonic acid), α-phenylacrylic acid, β-acryloxypropionic acid, sorbic acid, α-chlorosorbic acid, 2'-methylisocrotonic acid, cinnamic acid, p-chloro-cinnamic acid, β-stearyl acid, itaconic acid, citraconic acid, mesaconic acid, glutaconic acid, aconitic acid, maleic acid, fumaric acid, allylsulfonic acid, 4-vinylbenzylsulfonic acid, vinyl-toluenesulfonic acid, styrenesulfonic acid, sulfoethylmethacrylate, sulfoethylacrylate, sulfopropylmethacrylate, sulfopropylacrylate, 2-hydroxy-3-methacryloxypropylsulfonic acid, allylphosphonic acid, vinylbenzylphosphonic acid, methacrylamido(C1-C8)alkyl phosphonic acids, acrylamido(C1-C8)alkyl phosphonic acids, acrylamido(C1-C8)alkyldiphosphonic acids, phosphonomethylated vinylamines, (meth)acrylphosphonic acid, vinylphosphonic acid, vinylsulfonic acid, and 2-acrylamide-2-methylpropanesulfonic acid.

7. The electrolyte membrane of claim 1, wherein an amount of the polymerizable acid monomer is from about 50 parts to about 500 parts by weight, based on 100 parts by weight of the polymer in the polymer film.

8. The electrolyte membrane of claim 1, wherein the surface treatment agent comprises a functional group copolymerized with the polymerizable acid monomer.

9. The electrolyte membrane of claim 1, wherein the surface treatment agent is at least one selected from methacrylsilane, vinylsilane, and acrylsilane.

10. The electrolyte membrane of claim 1, wherein the composition comprises a cross-linking agent.

11. The electrolyte membrane of claim 10, wherein the cross-linking agent is at least one selected from polyethyleneglycol dimethacrylate, ethyleneglycol dimethacrylate, N',N-methylenebisacrylamide, ethylene diacrylate, polyethyleneglycol diacrylate, allyl methacrylate, diethyleneglycol dimethacrylate, triethyleneglycol dimethacrylate, tetraethyleneglycol dimethacrylate, 1,3-butanediol dimethacrylate, glycerine dimethacrylate, diurethane dimethacrylate, trimethylpropane trimethacrylate, epoxy acrylate, carbinol, butadiene, isoprene, chloroprene, divinylbenzene, bisphenol A dimethacrylate, divinylsulfone, and diethyleneglycol divinyl ether.

12. The electrolyte membrane of claim 1, wherein the electrolyte membrane comprises
   a polymer film;
   a polymerization product of a composition comprising i) the plurality of inorganic particles surface-treated with the surface treatment agent including the polymerizable double bond, ii) the polymerizable acid monomer, and (iii) the crosslinking agent.

13. A membrane-electrode assembly for a fuel cell, the membrane-electrode assembly comprising:
   a fuel electrode;
   an oxygen electrode; and
   the electrolyte membrane of claim 1 disposed between the oxygen electrode and the fuel electrode.

14. A fuel cell comprising the membrane-electrode assembly of claim 13.

* * * * *